United States Patent
Teshome et al.

(10) Patent No.: US 10,616,974 B2
(45) Date of Patent: Apr. 7, 2020

(54) AMBIENCE CONTROL MANAGED FROM AN INFORMATION HANDLING SYSTEM AND INTERNET OF THINGS NETWORK INTERFACE

(71) Applicant: Dell Products L.P., Round Rock, TX (US)

(72) Inventors: Abeye Teshome, Austin, TX (US); Srinivas Kamepalli, Austin, TX (US); Mohammed Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 15/964,489

(22) Filed: Apr. 27, 2018

(65) Prior Publication Data

US 2019/0335564 A1    Oct. 31, 2019

(51) Int. Cl.
| | |
|---|---|
| *H05B 37/02* | (2006.01) |
| *H04L 29/08* | (2006.01) |
| *G05B 15/02* | (2006.01) |
| *H04W 4/70* | (2018.01) |

(52) U.S. Cl.
CPC .......... *H05B 37/02* (2013.01); *G05B 15/02* (2013.01); *H04L 67/125* (2013.01); *H04W 4/70* (2018.02)

(58) Field of Classification Search
CPC ........ G08C 17/02; G08C 23/04; G08C 19/28; G08C 2201/92; G08C 2201/20; G08C 2201/30; G08C 19/00; G08C 2201/70; G08C 2201/91; G08C 2201/21; G08C 2201/32

USPC ...................................................... 340/4.31
See application file for complete search history.

(56) References Cited

U.S. PATENT DOCUMENTS

| | | | | |
|---|---|---|---|---|
| 6,761,470 | B2* | 7/2004 | Sid ..................... | H05B 37/0272 315/312 |
| 7,180,252 | B2* | 2/2007 | Lys .................... | H05B 33/0803 315/291 |
| 7,202,613 | B2* | 4/2007 | Morgan ................. | A01M 1/04 315/312 |
| 7,864,043 | B2* | 1/2011 | Camp, Jr. ............ | G01S 5/0252 340/539.13 |
| 8,307,442 | B2 | 11/2012 | Asati et al. | |
| 8,352,079 | B2* | 1/2013 | Wendt ..................... | A63F 13/02 700/275 |
| 8,522,335 | B2 | 8/2013 | Lawrence et al. | |
| 8,924,577 | B2 | 12/2014 | Choe | |
| 9,578,033 | B2 | 2/2017 | Matthieu et al. | |
| 9,667,635 | B2 | 5/2017 | Byers et al. | |
| 9,686,842 | B1* | 6/2017 | Coombes ................ | H04L 12/66 |
| 2004/0088564 | A1 | 5/2004 | Norman | |
| 2005/0248299 | A1* | 11/2005 | Chemel ................ | H05B 37/029 315/312 |
| 2013/0063042 | A1* | 3/2013 | Bora ................... | H05B 33/0863 315/292 |

(Continued)

*Primary Examiner* — Mark S Blouin
(74) *Attorney, Agent, or Firm* — Zagorin Cave LLP; Robert W. Holland (57) ABSTRACT

Information handling systems interacting through a network, such as gaming between distal locations, remotely control ambience lighting of rooms in which the games are presented to enhance the interactive experience. An Internet of Things environmental lighting control system accessed by a remote information handling system adjusts illumination responsive to settings communicated from the remote information handling system.

20 Claims, 4 Drawing Sheets

(56) References Cited

U.S. PATENT DOCUMENTS

2016/0330042 A1* 11/2016 Andersen .............. H04L 12/282
2017/0006065 A1    1/2017 Kamble et al.
2017/0006141 A1    1/2017 Bhadra

* cited by examiner

AMBIENCE CONTROL MANAGED FROM AN INFORMATION HANDLING SYSTEM AND INTERNET OF THINGS NETWORK INTERFACE

BACKGROUND OF THE INVENTION

Field of the Invention

The present invention relates in general to the field of information handling system network communication, and more particularly to ambience control managed from an information handling system and Internet of Things network interface.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Internet of Things (IoT) devices deployed in locations interact with information handling systems to help sense and control conditions in a location. For example, IoT controllers and sensors use an IoT network in an enterprise location, home or room to adjust ambience light conditions. Other IoT devices support room temperatures, appliance operation, location power consumption, or other factors. Typically IoT devices interface locally through wireless network communications, such as Bluetooth, Bluetooth Low Energy, Zigbee, Zwave, WiFi or other network interfaces. Generally, although IoT devices often interface with the Internet, control by IoT devices are managed locally, such as with an information handling system that interfaces with the IoT network at a location of the IoT network. For instance, smart home IoT devices will allow end users to send instructions remotely, however, the end user typically must access the IoT network through a password protected gateway that interfaces with the IoT devices. Generally, a firewall or other security steps are used to prevent unauthorized individuals from otherwise accessing the IoT devices.

SUMMARY OF THE INVENTION

Therefore, a need has arisen for a system and method which provides remote ambience control for an information handling system application interfaced with an Internet of Things (IoT) network and controller.

In accordance with the present invention, a system and method are provided which substantially reduce the disadvantages and problems associated with previous methods and systems for managing ambience lighting at a network location. An information handling system remotely interfaces with an IoT controller to control ambience lighting associated with an application executing local to the IoT controller, such as gaming application More specifically, first and second information handling systems interact through first and second copies of an application between first and second distal locations by communicating through a network. The first information handling system shares a security code with the second information handling system that the second information handling system sends to the first location to control ambience lighting at the first location through an IoT network and controller. The second information handling system adjusts ambience lighting, such as illumination brightness and colors, to enhance application functions resulting from application interactions, such as the results of an encounter in a gaming application. The first information handling system may also control ambience lighting locally and at the second location in concert with the second information handling system or may handoff control completely to the second information handling system or an intermediate server information handling system. The first information handling system sends a recovery code to return local control to the ambience lighting and have the IoT network and controllers ignore commands of the second information handling system. The first information handling system may also assert temporary control of ambience lighting with an overwrite code that takes priority over ambience light commands of the second information handling system. After reasserting control of ambience lighting, the first information handling system can command a default illumination or the IoT network and controller may return to the illumination setting applied at the outset when the security code was set.

The present invention provides a number of important technical advantages. One example of an important technical advantage is that a local IoT network having ambience lighting control is selectively leveraged to enhance a gaming application experience. In one embodiment, ambience lighting control at a first location is controlled remotely, such as by an information handling system at a second location, based upon progress in a game. Ambience commands sent from the second location are acknowledged and take priority over ambience commands issued locally so that gaming conditions are verified at the opponent information handling system without interference by the first information handling system. For example, the remote information handling system is provided direct access to the IoT controller that controls ambience light by sharing a security code that provides direct access. A bilateral communication allows each opponent to fully control ambience lighting at the other opponent's location with commands sent directly to IoT ambience light controllers at the opponent's physical location. An end user may reassert control over ambience lighting at the end user's location by issuing an overwrite or recovery code. Ambience lighting control available in an IoT network becomes a tool that enhances gaming and other types of applications with verification that remotely issued commands are performed. Other IoT network based controllers and sensors may be similarly leveraged, such as room temperature, ambient light sensing, window shades, stereo speakers, etc. . . . . .

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Dynamic ambience control by an information handling system leverages an IoT smart home infrastructure to coordinate illumination commanded in cooperation with remote information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
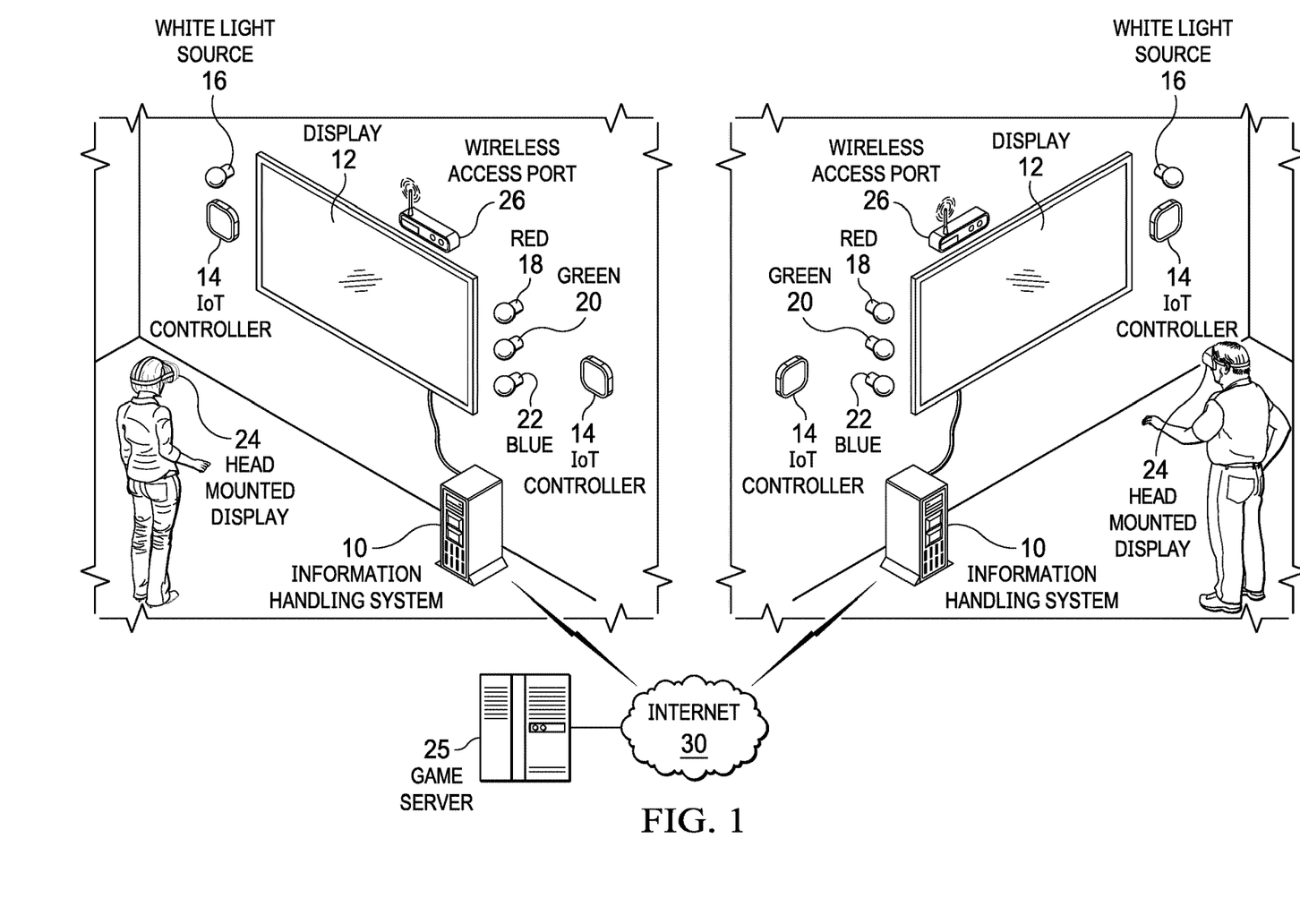
FIG. 1 depicts a block diagram of a system for remote management of room illumination coordinated by an application executing on information handling systems interacting through a network.

Referring now to FIG. 1, a block diagram depicts a system for remote management of room illumination coordinated by first and second copies of an application executing on information handling systems interacting through a network. In the example embodiment, first and second information handling systems 10 each executes a copy of a gaming application that interacts through the Internet 30. For instance, the gaming application creates an imaginary battleground that is presented on a display 12 or through a head mounted display 24 so that end users associated with each information handling system 10 compete to win the game. In some instances, the gaming application establishes a network connection directly between two information handling systems 10 while in other instances a game server 25 intermediates all or part of the communications between the information handling systems 10. The gaming application creates a mixed reality by presenting gaming information as visual images at a display 12 that is viewed through other visual images presented at head mounted display 24. In some instances, mixed reality combines the virtual world created by the game with real world inputs, such as by sensing and applying accelerations associated with an end user. Although the example embodiment depicts first and second information handling systems at first and second distal locations, in alternative embodiments multiple information handling systems may interact from multiple locations, such as hundreds of gamers interacting from hundreds of different locations. In an example where multiple information handling systems execute a gaming application, ambience lighting commands as described herein will typically be managed by game server 25.

In order to enhance the mixed reality experienced by an end user, ambience light control is provided to the gaming application so that "smart home" lighting capabilities are leveraged during gaming information presentation. In the example embodiment, multiple Internet of Things (IoT) controllers 14 in each gaming location interface with room lighting to control illumination, such as room lights brightness and color. For instance, each room in the example embodiment has a white light 16, a red light 18, a green light 20 and a blue light 22, which interface with one or more IoT controllers 14. IoT controllers accept wired or wireless commands that set illumination by lights 16-22. In various embodiments, IoT controllers 14 accept wireless commands through WiFi, Bluetooth Low Energy, Zigbee, Zwave or other wireless signal communication protocols. IoT controllers 14 may interface directly with an information handling system to accept commands or may receive commands through a wireless network, such as a wireless local area network (WLAN) supported by a wireless access point (WAP) 26. As an example, a voice activated command issued to an information handling system adjusts ambience light levels with the information handling system issuing illumination setting commands through a WLAN to controllers 14.

Information handling systems 10 cooperating through networked communications leverage IoT controllers 14 so that ambience lighting enhances the gaming experience. For example, as the game progresses, ambience lighting control adjusts to create a mixed reality presentation that matches the game progress and situation. For instance, if a player in the game enters a cave, the gaming application commands IoT controllers 14 to transition to a low light or dark environment in the room where the end user is playing to create an environment that matches the game presentation. In alternative situations, player moods or health may be enhanced based on game progression and situation, such as by making viewing around the room more difficult as the player health deteriorates during the game. Although the example embodiment describes implementation with a gaming application, in alternative embodiments, ambience lighting may instead leverage other entertainment applications, communication applications or calendars by adapting illumination to an environment for each application, such as by dimming lights when casting a movie to a television. For instance, machine learning adapts ambience lighting to an end user based upon applications executed by the end user, inputs made by the end user and environmental conditions.

In the gaming application example, each information handling system 10 at each location detects available ambience lighting controllers 14 to establish a local interface, such as with communication through WAP 26 with wireless signals. Local access by information handling system 10 within the gaming room location is secured with local authentication, such as behind a firewall or using password protected logic within controllers 14. After information handling system 10 has access to send commands to IoT controllers 14, the gaming application can leverage ambient lighting locally or, alternatively, can coordinate ambient lighting adjustments through Internet 30 with other copies of the gaming application running on distal information handling systems 10 in other locations. For example, gaming applications coordinate a security code that provides information handling systems 10 external to an IoT controller 14 location with direct access through a network to IoT controllers 14 for remote location control of ambience lighting. In one example embodiment, a gaming application executing at a first location provides a security code to a gaming application executing at a second location and to IoT controllers 14 that control ambience lighting at the first location. With the security code, the information handling system at the second location sends commands to IoT controllers of the first location to adjust ambience lighting based upon game situations or progress. For instance, a bomb attack by the second location is emphasized by sending a bright flash of light from the second location through the network to the IoT controllers 14 of the first location. In one embodiment, an acknowledgment of performance of the command is provided from the IoT controllers 14 back to the second location so that the game tracks ambience lighting conditions of opponents. Thus, for instance, an attack meant to temporarily blind an opponent with a bright flash is enforced and confirmed remotely. In one embodiment, for instance, activation of the security code may remove the ability of a local information handling system 10 to control IoT controllers 14 so that all ambience lighting is controlled external to the location, such as from a server or an opponent information handling system at a second location and interfaced through a network. Alternatively, remote ambience lighting commands may be given priority over local commands with local commands to control ambience lighting reported to the external information handling system. In addition to flashing lights and adjusting brightness, ambience light color may also be controlled from an external network location.

In one embodiment, information handling system 10 at the second location directly commands IoT controllers 14 with network communications through WAP 26 by including the security code or other security information. Information handling system 10 at the first location initiates a security state by providing the security code to IoT controllers 14. Once in the security state, information handling system 10 at the second location controls ambience lighting by sending commands with the security code. Control of ambience lighting may be routed directly to IoT controllers 14 or through the information handling system 10 of the first location. Information handling system 10 may end remote ambience light control by issuing a recovery code or an overwrite code. A recovery code commands IoT controllers 14 to ignore the security code, thus reverting control of ambience lighting to the local information handling system 10. The overwrite code provides a temporary overwrite of ambience light settings so that the end user at the first location can temporarily exert control over ambience lighting, such as during a pause or break from the game. Although the example embodiment focuses on ambience lighting, in alternative embodiments other types of IoT devices may be controlled, such as motion sensors, cameras, security systems, etc. . . . .

Figure 2:
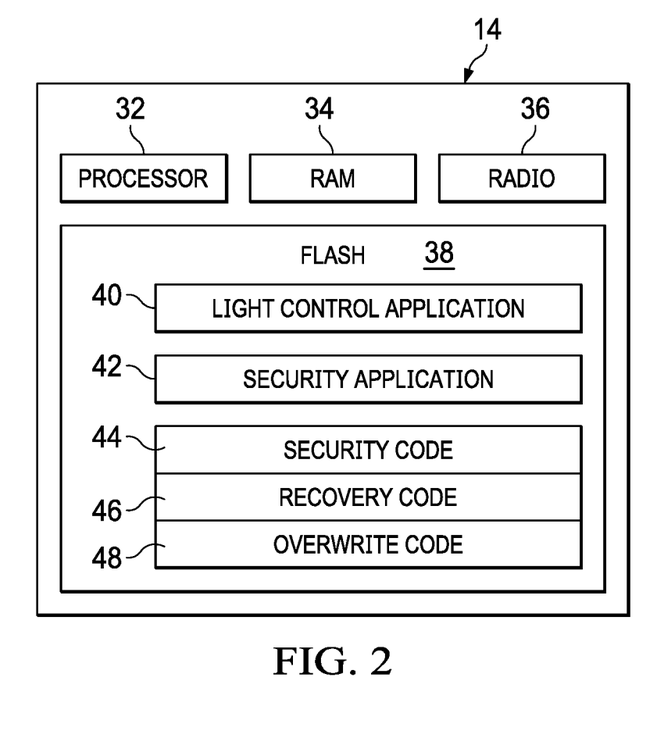
FIG. 2 depicts a block diagram of an IoT controller that supports external ambience lighting control.

Referring now to FIG. 2, a block diagram depicts an IoT controller 14 that supports external ambience lighting control. In the example embodiment, IoT controller 14 is a headless device that includes a system on chip having a processor 32, random access memory 34, a radio 36 and a non-transitory flash memory 38. For example, radio 36 supports communication with a standard protocol, such as Bluetooth, Zigbee or WiFi. Flash 38 stores a light control application 40 that controls lights interfaced with IoT controller 14, such as with a GPIO or an actuator. In one embodiment, IoT controller 14 may be configured as a gateway device that forwards lighting control commands to other IoT devices. In some instances, processor 32 may interface with a network through a wired interface, such as Ethernet, in addition to an interface through radio 36. A security application 42 stored in flash memory 38 executes on processor 32 to selectively provide access to light control application 40 by external information handling systems. For example, if a security code 44 is communicated to security application 42 by an authorized source, security application 42 allows commands received from an external network that include the security code 44. If a security code 44 is not enabled at security application 42, then commands to IoT controller 44 are handled by light control application 40, such as by restricting control of ambience lighting to local devices and information handling system inputs. If a security code 42 is active, then an input of recovery code 46 removes security code 44 to end external inputs to IoT controller 14. If a security code 44 is active, an overwrite code 48 temporarily disables security code 44 and applies illumination settings provided with the overwrite code 48. The overwrite may be temporary based upon a time or until the overwrite code is removed by an end user. Although the example embodiment depicted by FIG. 2 describes control of ambience lighting, in alternative embodiments, the process may apply to other types of home environment systems that are managed by IoT controllers or sensors. As an example, a sound control application in IoT controller 44 may control a stereo and speaker that plays selected background music or sounds in response to commands sent from a network external to the location of the IoT network. Other types of home environment systems may include control of a house alarm system, such as setting off a security or fire alarm, control of window shades, control of ceiling fans, control of an alarm clock, control of appliances and control of temperatures, such as by setting a heat or air conditioning temperature.

Figure 3:
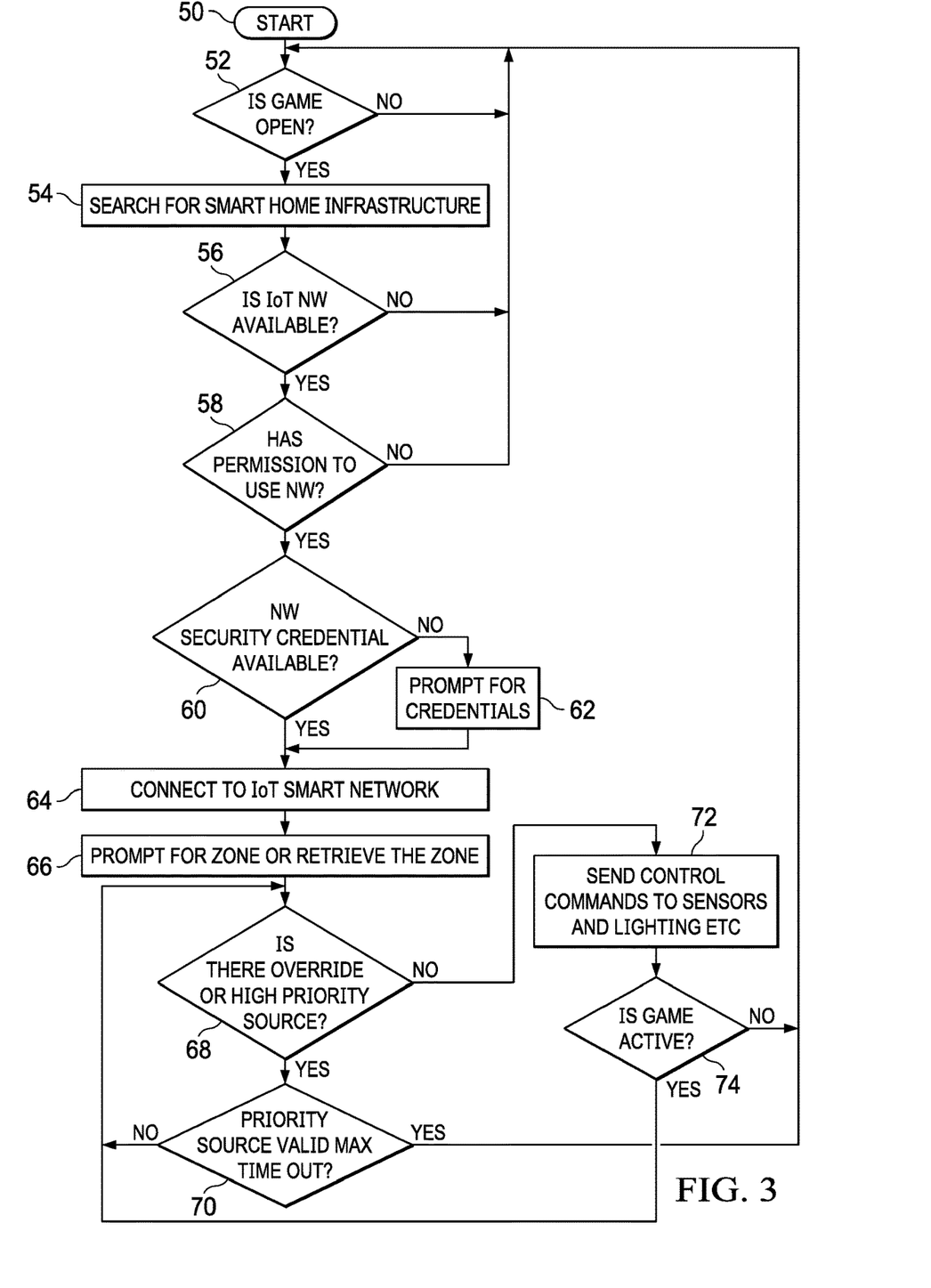
FIG. 3 depicts a flow diagram of a process for managing external ambience lighting control through a network.

Referring now to FIG. 3, a flow diagram depicts a process for managing external ambience lighting control through a network. The process starts at step 50 with an interface of an IoT controller with ambience lighting at a location. The process continues to step 52 to determine if a game is open at the location and, if not, returns to step 50 to continue monitoring. If an open game is detected at step 52 the process continues to step 54 to search for IoT controllers of a smart home infrastructure that controls ambience illumination. If at step 56 a determination is made that an IoT network is not available, the process returns to step 50. If at step 56 an IoT network is available, the process continues to step 58 to determine if permission was granted to the game to access the IoT network. If not, the process returns to step 50. If permission was granted at step 58, the process continues to step 60 to initiate interaction of the game with the IoT network and controllers.

At step 60 a determination is made of whether the IoT network credentials are available to provide the game with access to the IoT network. If not, the process continues to step 62 to prompt for credentials. Once network credentials are available, the process continues to step 64 to connect to the IoT network to control illumination. At step 66, the game prompts for a desired zone of illumination, such as a room in which the end user is located. At step 68 a determination is made of whether an override or a high priority control source exists that has priority over illumination commanded by the game. If a higher priority exists, the process continues to step 70 to determine if a timeout applies to the override. If a timeout exists, the process continues to step 68 to monitor for the timeout to complete. If the override is not limited in time, the process returns to step 50. At step 68, if not override exists, the process continues to step 72 to send illumination control commands to IoT sensors and lighting controllers as provided from the game. At step 74 a determination is made of whether the game is active. If active, the process continues to monitor control commands at step 72 until the game goes dormant. Once the game ends, the process returns to step 50 to await the next game instance.

Figure 4:
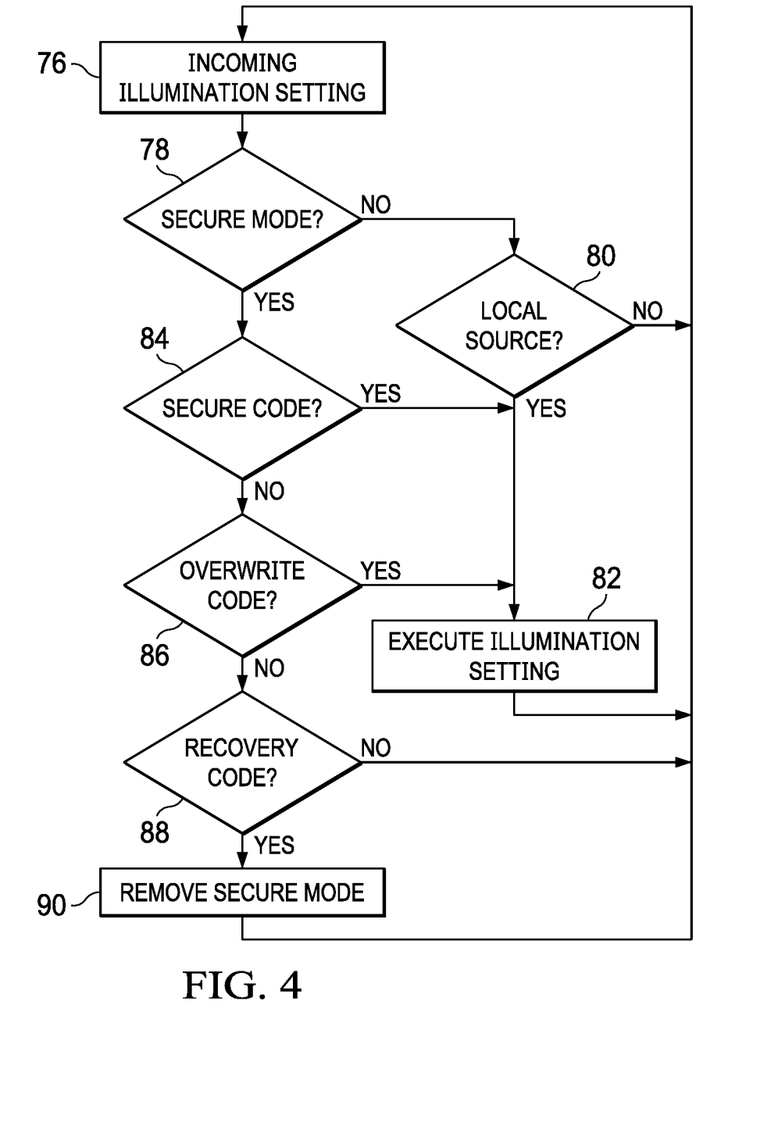
FIG. 4 depicts a flow diagram of a process managing security of external ambience illumination control.

Referring now to FIG. 4, a flow diagram depicts a process for managing security of external ambience illumination control. The process starts at step 76 with an incoming illumination setting communicated to an IoT controller. At step 78 a determination is made of whether the IoT controller is in a secure mode, meaning that external illumination settings are accepted at the IoT controller for application to room lights that set ambience. If the secure mode is not set, the process continues to step 80 to determine if the IoT controller received a command from a local source. If the command is from a local or otherwise authorized source, the process continues to step 82 to execute the illumination setting. If the command is not from a local or other authorized source, the process returns to step 76 without executing the illumination setting.

If at step 78 the IoT controller is in a secure mode that accepts illumination commands from an external source, the process continues to step 84 to determine if the command includes the security code. If the security code is included, the process continues to step 82 to execute the illumination setting. If the security code is not included, the process continues to step 86 to determine if the command includes an overwrite code that indicates a priority to the included illumination setting. If an overwrite code is included, the process continues to step 82 to execute the illumination setting. If at step 86 an overwrite code is not included, the process continues to step 88 to determine if a recovery code is included. If not, then the command is not valid, the illumination setting is ignored and the process returns to step 76. If at step 88 the recovery code is present, the process continues to step 90 to remove the secure mode and set illumination to a default or pre-game setting. In alternative embodiments, the example process of FIG. 4 may be applied to control other home environment factors as described above with respect to FIG. 2.

Although the present invention has been described in detail, it should be understood that various changes, substitutions and alterations can be made hereto without departing from the spirit and scope of the invention as defined by the appended claims.

What is claimed is:

1. A system for managing lighting at a first location based upon information generated at the first location and information generated at a second location distal the first location, the system comprising:
    a first information handling system disposed at the first location and executing a first copy of an application that generates first information responsive to inputs by a first end user;
    a second information handling system disposed at the second location and executing a second copy of the application that generates second information responsive to inputs by a second end user;
    a network interface communicating the first and second information between the first and second information handling systems; and
    one or more lights disposed at the first location, each light having a controller to adjust illumination responsive to commands communicated through a first wireless network; and
    one or more lights disposed at the second location, each light having a controller to adjust illumination responsive to commands communicated through a second wireless network;
    wherein the application first and second copies interact through a network to exchange the first and second information including at least the commands to adjust illumination.

2. The system of claim 1 further comprising:
    a first user interface presented by the first information handling system to accept settings from the first end user that defines access by the second information handling system to the lights at the first location; and
    a second user interface presented by the second information handling system to accept settings from the second end user that defines access by the first information handling system to the lights at the second location.

3. The system of claim 2 wherein the settings comprise a security code that grants direct access by the second information handling system to the wireless network to command illumination of the lights of the first location.

4. The system of claim 3 wherein the security code further grants direct access by the second information handling system to acknowledgement by the lights of the first location to the command.

5. The system of claim 2 wherein the settings comprise a recovery code that removes all access by the second information handling system to the wireless network to command illumination of the lights.

6. The system of claim 5 wherein activation of the recovery code communicates a message to the second information handling system.

7. The system of claim 2 wherein the security code excludes access by the first information handling system to command illumination of the lights of the first location.

8. The system of claim 2 wherein the settings comprise an association between predetermined information communicated from the second information handling system to the first information handling system and a predetermined illumination command.

9. The system of claim 8 wherein the association comprises commanding flashing of the lights at the first location in response to information from the second information handling system indicating an attack in a game.

10. A method for managing lighting at a first location, the method comprising:
    interfacing one or more first location room lights with one or more Internet of Things (IoT) controllers;
    adjusting illumination of the one more first location room lights with commands communicated through wireless signals to the IoT controllers;
    interfacing a gaming application executing on an information handling system at the first location with the IoT controllers;
    sending commands from the first information handling system to the IoT controllers to adjust illumination of the first location room lights;

receiving gaming information through a network from a second location distal the first location;

applying the gaming information with the gaming application; and adjusting the illumination in response to the gaming information with commands communicated through wireless signals to the IoT controllers.

11. The method of claim 10 wherein the adjusting the illumination in response to the gaming information further comprises:

including light illumination settings in the gaming information at the second location; and directly applying the light illumination settings to the IoT controllers.

12. The method of claim 11 wherein directly applying the light illumination settings further comprises:

communicating the light illumination settings to a wireless access point at the first location; and communicating the light illumination settings from the wireless access point directly to the IoT controllers through wireless signals.

13. The method of claim 12 further comprising:

communicating a security code from the first information handling system to the second information handling system;

communicating the security code from the first information handling system to the IoT controllers;

communicating the security code from the second information handling system with the illumination settings; and prioritizing illumination settings at the IoT controllers that include the security code.

14. The method of claim 13 further comprising:

sending a recovery code from the first information handling system to the IoT controllers; and in response to the recovery code, disregarding illumination settings communicated from the second information handling systems.

15. The method of claim 13 further comprising:

sending an overwrite code from the first information handling system to the IoT controllers; and in response to the overwrite code, applying an overwrite illumination setting at the IoT controllers prioritized over illumination settings of the gaming information.

16. The method of claim 10 wherein:

the one or more first location room lights comprise plural lights that illuminate with plural colors; and the gaming information comprises illumination color selected from the plural colors.

17. An IoT light controller comprising:

a processor operable to execute instructions;

a wireless radio operable to communicate wireless signal;

a controller operable to interface with one or more room lights to control illumination of the room light; and non-transitory memory interfaced with the processor and storing instructions that when executed on the processor:

command a first illumination in a first security state in response to a first wireless signal; and command a second illumination in a second security state in response to a second wireless signal, the second wireless signal including a security code.

18. The IoT light controller of claim 17 wherein the wireless signal comprises a wireless local area network interfaced with the Internet.

19. The IoT light controller of claim 18 wherein:

the first security state comprises communication originating locally within the wireless local area network; and the second security state comprises communications originating external to the wireless local area network.

20. The IoT light controller of claim 19 wherein the security code comprises a security code generated by a first copy of an application locally within the wireless local area network and communicated externally to a second copy of the application.

* * * * *